C. M. CROSBY.
NUT LOCK.
APPLICATION FILED OCT. 2, 1917.
1,294,410.
Patented Feb. 18, 1919.
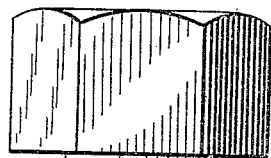
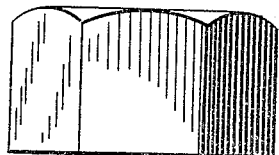
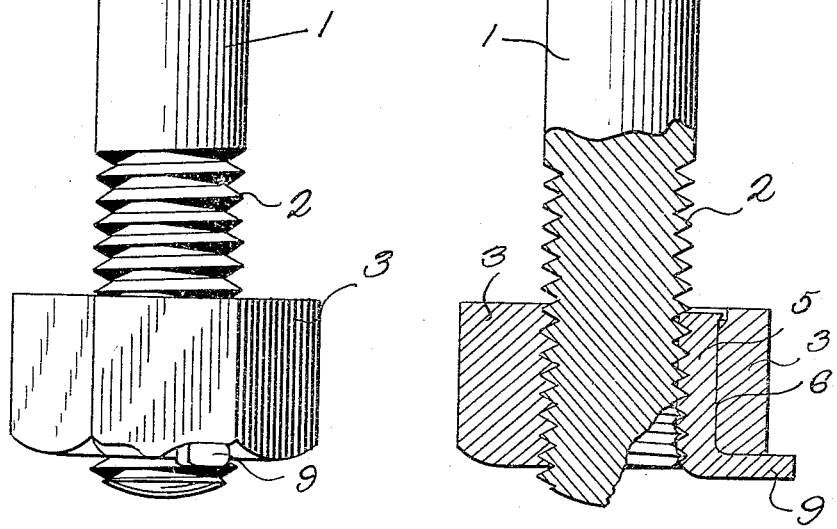
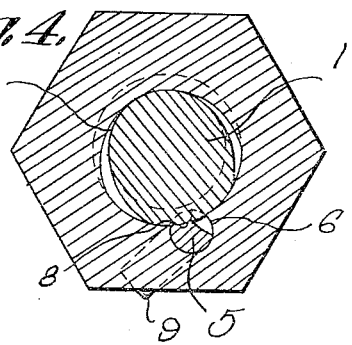
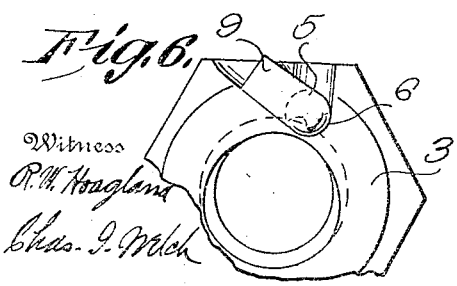
Inventor
Charles M. Crosby
By Staley & Bowman
Attorneys
Witness
R. W. Hoagland
Chas. J. Welch

UNITED STATES PATENT OFFICE.

CHARLES M. CROSBY, OF SPRINGFIELD, OHIO, ASSIGNOR, BY DIRECT AND MESNE ASSIGNMENTS, TO HIMSELF, HARRY A. BRENNER, AND CLYDE C. MINER, COPARTNERS, DOING BUSINESS AS CROSBY LOCKNUT COMPANY.

NUT-LOCK.

1,294,410.     Specification of Letters Patent.     Patented Feb. 18, 1919.

Application filed October 2, 1917. Serial No. 194,319.

*To all whom it may concern:*

Be it known that I, CHARLES M. CROSBY, a citizen of the United States, residing at Springfield, in the county of Clark and State of Ohio, have invented certain new and useful Improvements in Nut-Locks, of which the following is a specification.

This invention relates to an improvement in fastening devices such as bolts employing nuts that are to be locked in position and the particular object is to so arrange the parts that a mere turning of the locking member will lock the nut to the fastening device such that there will be no permissible reverse movement of the nut until positively thrown to release position.

In the drawings:—

Figure 1 is a plan view of the fastening device and nut.

Fig. 2 shows part of the fastening device and nut and locking member in section.

Fig. 3 is a transverse sectional view looking at the nut from the rear side of the same showing the locking member in release position.

Fig. 4 is a similar view to Fig. 3 showing the locking member in locking position.

Fig. 5 is a detail view of the locking device.

Fig. 6 is a detail showing the seats for the locking member.

Throughout the drawings like figures indicate like parts.

Referring to the drawings the fastening device is shown in the form of a bolt marked 1 having the usual head and a screw-threaded portion marked 2, the nut is indicated by 3 and the locking member by 5.

A main feature of this locking device is that before tapping the nut the locking member 5 is inserted in an opening marked 6 (Figs. 3 and 4) formed in the nut and adjacent to the place where the nut is to be tapped. The nut is then tapped so that the locking member 5 has formed on a section of its outer face screw-threads of the same pitch as the pitch of the threads formed on the interior of the nut, and it will be apparent that the partial or segmented threads formed on the locking member 5 will have threads of eccentric form in that the grooves will be deepest in the center and will be narrow at the points near the termination of the threads and consequently in turning the locking member 5 it will not only have a rotating movement but will have some movement transverse to the horizontal plane of the nut due to the conformation of the threaded portion of said locking member.

Adjacent to the threaded portion of the locking member 5, there is preferably formed a groove marked 7 or a recessed part having a projecting edge 8, which, when the locking member is turned to the locking position shown in Fig. 4, will act to contact against or impinge upon the threads of the fastening device, which in the illustration is shown as a bolt. The locking member is shown with a rivet or head to hold it from dropping out of the nut when the nut is removed from the bolt.

To insert the nut upon the bolt the locking member is moved to normal or release position, so that the threads on the locking member will register with the threads on the bolt and nut and the bolt and nut are then adjusted and when the bolt and nut have been adjusted to proper position such that the nut acts to fasten the bolt properly the locking member is then given a slight turn by any ordinary appliance applied to the handle 9, (see Fig. 5) and the effect of giving this locking member a sufficient turn is to bring the impinging edge 8 in the position shown in Fig. 4, such that the nut will be locked to the bolt so that the nut can not be turned reversely or be jarred in any way by excessive shock.

In order to insure the locking member against movement from its locking position, there are shown two seats formed on the outer face of the nut and the handle 9 of the locking member is adapted normally to rest in the first one of these seats and when the locking member is given a partial turn to throw it into locking position, the handle 9 will be forced up the cam surface between the two seats and after passing that surface the spring character of the metal of which the locking member is formed will cause the handle to drop into the second seat and as shown in the drawings there is a slight shoulder formed between the two seats to prevent the locking member from returning to first position until it is forced over the shoulder by proper appliances applied to it.

The relation of the threads of the locking pin with respect to the edge 8 is such that the threads of the pin will not be turned completely out of mesh with the threads of the bolt, but the extreme edge of the threads adjacent the groove in the pin will remain in mesh as shown at 5ᵃ in Fig. 4 and by the cam action referred to those portions of the threads of the pin still in mesh will tightly impinge the threads of the bolt to give an additional locking effect. Further, this maintains the threads of the pin and bolt in proper alinement so that if it is desired to unlock the nut by turning the pin back to its initial position, the threads will be in proper position for this purpose so that there will be no danger of the threads of the pin and nut respectively meeting end to end as might be the case if the threads were thrown completely out of mesh.

Having thus described my invention, it is claimed as follows:—

1. In a device of the character described, two threaded members one capable of being threaded upon the other, and a locking member, said locking member being rotatably mounted in one of said threaded members and provided with partial screw-threads which conform to the screwthreads of the member in which it is mounted, said locking member being capable of longitudinal movement and the threaded member in which it is mounted having means whereby when said locking member is rotated it will be drawn in a longitudinal direction to an extent to cause its screwthreads to remain partly in mesh with and impinge the screwthreads of the other threaded member.

2. In a device of the character described, two threaded members one capable of being threaded upon the other, a locking member, the locking member being rotatably mounted in one of said threaded members and provided with partial screwthreads which conform to the screwthreads of the member in which it is mounted, the construction and arrangement of the parts being such that when the said locking member is rotated the sides of its threads will remain partly in mesh with and impinge the sides of the threads of the other threaded member, for the purpose specified.

3. In a device of the character described, two threaded members one capable of being threaded upon the other, and a locking member, said locking member being rotatably mounted in one of said threaded members and provided with partial screwthreads which conform to the screwthreads of the member upon which it is mounted, said locking member having a groove extending along one side of the threads, whereby upon rotation of said locking member the edges of the groove will be caused to impinge the threads of the other screw-threaded member.

4. In a lock nut, the combination of a fastening member and nut and a locking member, the locking member having a screw-threaded section and a recessed portion, and also engaging surfaces beyond the recessed portion for binding against the locking member, substantially as specified.

5. In a lock nut, the combination of a fastening member, a nut and a locking member rotatably mounted in the nut prior to its insertion on the bolt and provided with segmented screwthreads of substantially the same curvature as the threads of the nut, and seats for the locking member formed on the nut for holding the same against reverse movement for the purpose specified.

6. In a lock nut, the combination of a threaded fastening member, a nut threaded thereon, a rotatable locking pin arranged to be inserted in the nut and partly threaded with threads of substantially the same pitch as the pitch of the threads of the nut, the threads of the said locking member in normal position forming a continuation of the threads of said nut, said locking pin having a groove at one side of its threads, whereby rotation of said locking pin will cause the outer edges of the groove to impinge the threads of the threaded member to lock said nut.

7. In a lock nut, the combination of a threaded member with a nut and a rotatable and length-wise movable locking member inserted in the nut and partially threaded with threads of substantially the same pitch as the pitch of the threads for the nut, the threads of said locking member in normal position forming a continuation of the threads of said nut, said nut having an inclined face to engage said locking member upon rotation of the same to displace the same lengthwise and said nut having a recess to receive a part of said locking member to hold the same in its locked position.

8. In a device of the character described, two threaded members one capable of being threaded upon the other, a locking member, said locking member being rotatably mounted in one of said threaded members and provided with partial screwthreads which conform to the screwthreads of the member in which it is mounted, and means whereby when said locking member is rotated the sides of its threads will be drawn into and remain partly in locking contact with the sides of the threads of the other screw-threaded member during the locking position of said locking member.

9. In a device of the character described, two threaded members one capable of being threaded upon the other, a locking member, said locking member being rotatably mounted in one of said threaded members and provided with partial screwthreads which conform to the screwthreads of the member in which it is mounted, and means whereby when said locking member is rotated the sides of its threads will be drawn into locking contact with the sides of the threads of the other screwthreaded member, together with means for holding said locking member in locking position.

In testimony whereof, I have hereunto set my hand this 24th day of September, 1917.

CHARLES M. CROSBY.

Copies of this patent may be obtained for five cents each, by addressing the "Commissioner of Patents, Washington, D. C."